United States Patent [19]

Kato et al.

[11] Patent Number: 4,480,606

[45] Date of Patent: Nov. 6, 1984

[54] INTAKE SYSTEM OF AN INTERNAL COMBUSTION ENGINE

[75] Inventors: Shinichi Kato; Katsuhiko Motosugi; Masatami Takimoto; Haruo Yamada, all of Toyota; Kisaburo Mizuno, Aichi; Mitsuyoshi Teramura, Toyota, all of Japan

[73] Assignee: Toyota Jidosha Kabushiki Kaisha, Japan

[21] Appl. No.: 433,902

[22] Filed: Oct. 12, 1982

[30] Foreign Application Priority Data

Oct. 14, 1981 [JP] Japan .............................. 56-162675

[51] Int. Cl.³ .......................... F02M 7/00; F01L 3/00
[52] U.S. Cl. ................. 123/188 M; 123/440; 123/478; 123/489
[58] Field of Search .......... 123/489, 440, 478, 188 M, 123/52 M

[56] References Cited

U.S. PATENT DOCUMENTS

| | | | |
|---|---|---|---|
| 4,099,491 | 7/1978 | Reddy | 123/440 |
| 4,143,623 | 3/1979 | Norimatsu et al. | 123/440 |
| 4,156,413 | 5/1979 | Taplin | 123/489 |
| 4,168,679 | 9/1979 | Ikeura et al. | 123/489 |
| 4,169,440 | 10/1979 | Taplin et al. | 123/489 |
| 4,286,554 | 9/1981 | Okamoto | 123/188 M |
| 4,376,369 | 3/1983 | Horikoshi et al. | 123/440 |
| 4,385,608 | 5/1983 | Ohgomi et al. | 123/440 |
| 4,393,842 | 7/1983 | Otsuka et al. | 123/440 |
| 4,399,792 | 8/1983 | Otsuka et al. | 123/440 |

Primary Examiner—Ira S. Lazarus
Attorney, Agent, or Firm—Parkhurst & Oliff

[57] ABSTRACT

An internal combustion engine having a helically-shaped intake port. When the intake manifold vacuum is in the range of about −500 through −250 mmHg, a super lean mixture is fed into the cylinders of the engine. When the intake manifold vacuum is in the range of about −250 through −100 mmHg, a fuel mixture, having the stoichiometric air-fuel ratio, is fed into the cylinders of the engine. When the intake manifold vacuum is smaller than about −100 mmHg, a rich mixture is fed into the cylinders of the engine.

27 Claims, 14 Drawing Figures

INTAKE SYSTEM OF AN INTERNAL COMBUSTION ENGINE

BACKGROUND OF THE INVENTION

The present invention relates to an intake system of an internal combustion engine.

For improving a specific fuel consumption, a method of using a lean mixture is known. However, since the propagating speed of flame of a lean mixture is inherently low and, thus, the burning velocity is low, it is difficult to obtain a stable combustion. Particularly in the case where a so-called super lean mixture, having an air-fuel ratio which is larger than 20:1, is used, since the burning velocity becomes even lower, it is more difficult to obtain a stable combustion. For increasing the burning velocity, a method of creating a swirl motion in the combustion chamber is known. However, it has been proven that, if such a swirl motion is too strong or too weak, it is difficult to obtain a stable combustion, and that an optimum strength of the swirl motion is present in accordance with kinds of engine types.

SUMMARY OF THE INVENTION

An object of the present invention is to provide an intake system of an internal combustion engine, which is capable of creating a swirl motion, having a strength which is suitable for obtaining the stable combustion of a super lean mixture, in the combustion chamber.

According to the present invention, there is provided an internal combustion engine comprising: a helically-shaped intake port; an intake passage connected to said intake port; an exhaust passage; a vacuum sensor arranged in said intake passage for detecting the level of vacuum in said intake passage; an oxygen concentration detector arranged in said exhaust passage for detection whether the air-fuel ratio of mixture fed into the engine from said intake port is larger or smaller than the stoichiometric air-fuel ratio; an air-fuel ratio control device arranged in said intake passage for controlling the amount of fuel and air fed into said intake passage, and an electronic control unit controlling said air-fuel ratio control device in response to output signals of said vacuum sensor and said oxygen concentration detector for feeding a first lean mixture into the engine when said level of vacuum is in the range of about −500 through −250 mmHg; for feeding a fuel mixture having the stoichiometric air-fuel ratio into the engine when said level of vacuum is in the range of about −250 through −100 mmHg; and for feeding a rich mixture into the engine when said level of vacuum is smaller than about −100 mmHg.

The present invention may be more fully understood from the description of a preferred embodiment of the invention set forth below, together with the accompanying drawings.

DESCRIPTION OF A PREFERRED EMBODIMENT

Figure 1:
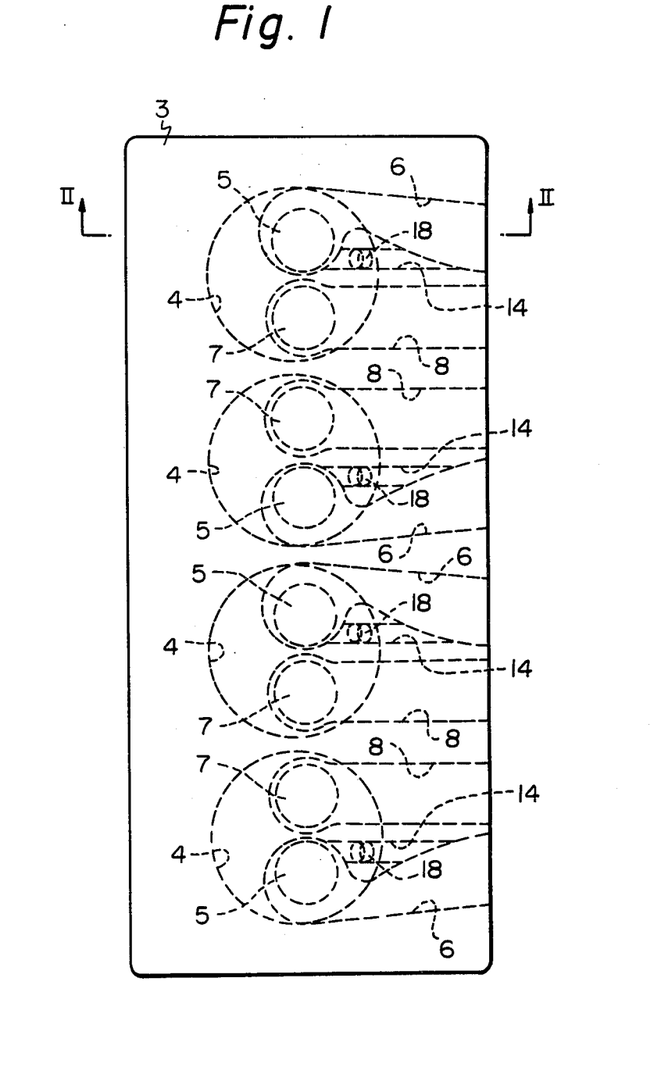
FIG. 1 is a plan view of an internal combustion engine according to the present invention.
Figure 2:
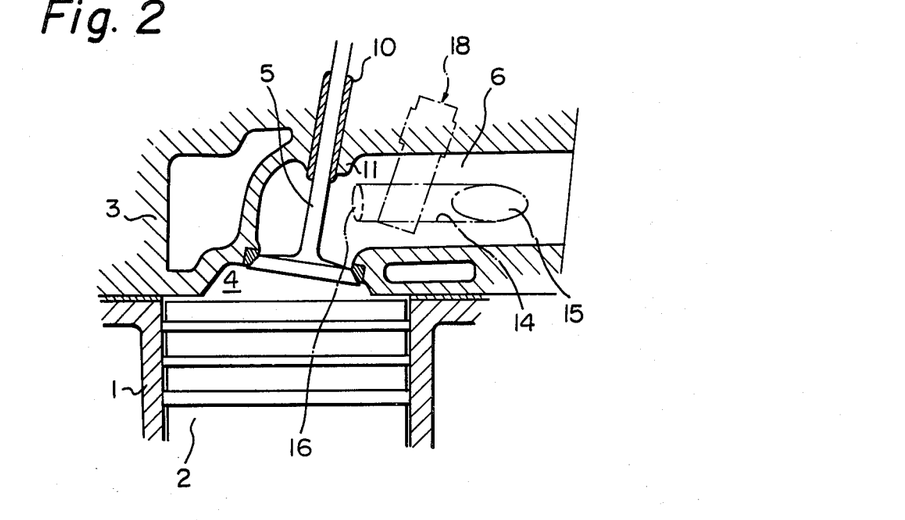
FIG. 2 is a cross-sectional view taken along the line II—II in FIG. 1.

Referring to FIGS. 1 and 2, reference numeral 1 designates a cylinder block, 2 a piston reciprocally movable in the cylinder block 1, 3 a cylinder head fixed onto the cylinder block 1, and 4 a combustion chamber formed between the piston 2 and the cylinder head 3; 5 designates an intake valve, 6 a helically-shaped intake port formed in the cylinder head, 7 an exhaust valve, and 8 an exhaust port formed in the cylinder head 3. A spark plug (not shown) is arranged in the combustion chamber 4.

Figure 3:
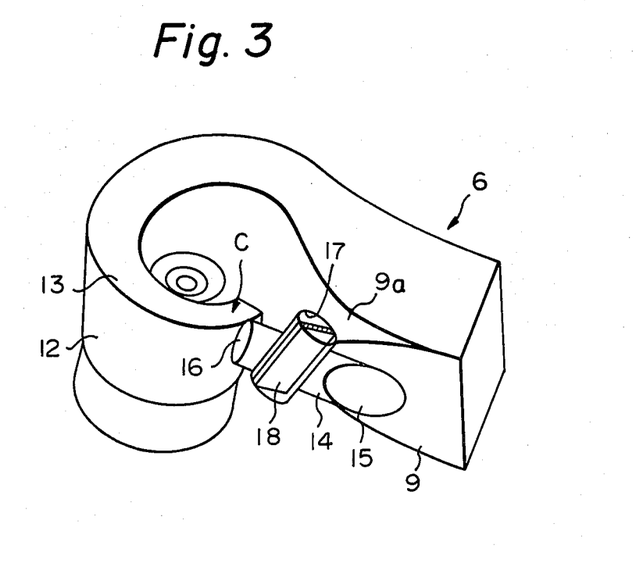
FIG. 3 is a perspective view schematically illustrating the shape of a helically shaped-intake port.
Figure 4:
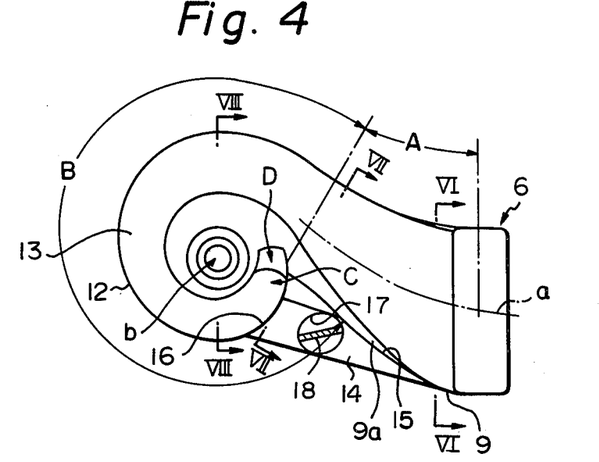
FIG. 4 is a plan view of FIG. 3.
Figure 5:
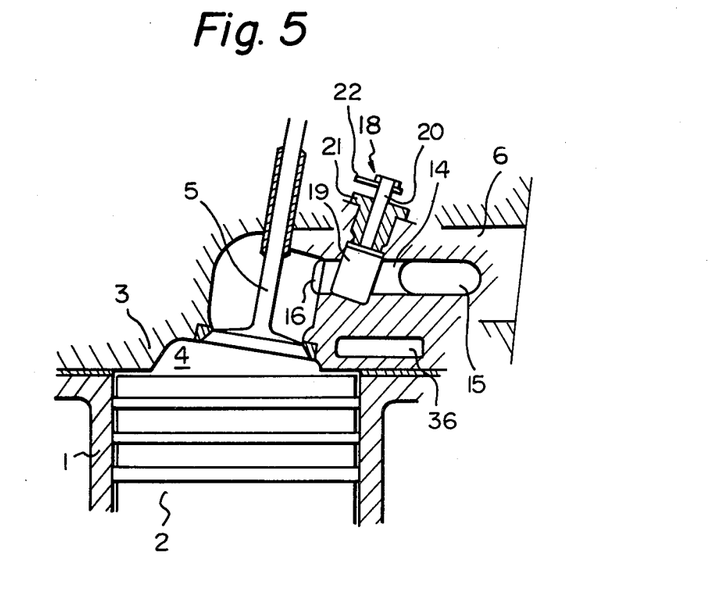
FIG. 5 is a cross-sectional view taken along the by-pass passage in FIG. 3.
Figure 6:
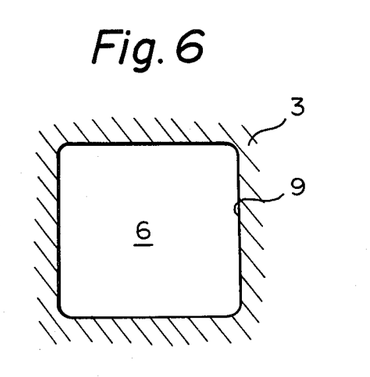
FIG. 6 is a cross-sectional view taken along the line VI—VI in FIG. 4.
Figure 7:
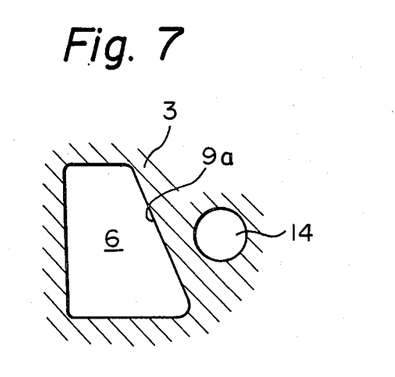
FIG. 7 is a cross-sectional view taken along the line VII—VII in FIG. 4.
Figure 8:
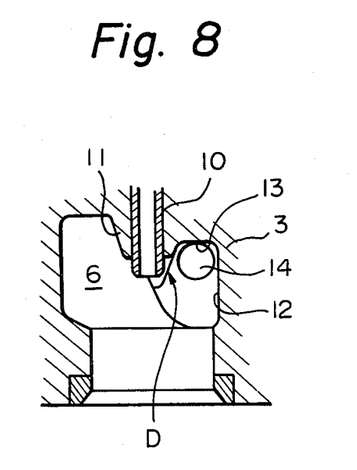
FIG. 8 is a cross-sectional view taken along the line VIII—VIII in FIG. 4.

FIGS. 3 through 5 schematically illustrate the shape of the helically-shaped intake port 6 illustrated in FIG. 2. As illustrated in FIG. 4, the helically-shaped intake port 6 comprises an inlet passage portion A the longitudinal central axis of which is slightly curved, and a helical portion B formed around the valve stem of the intake valve 5. The inlet passage portion A is tangentially connected to the helical portion B. As illustrated in FIGS. 3, 4, and 7, the side wall 9 of the inlet passage portion A, which is located near the helix axis b, has on its upper portion an inclined wall portion 9a which is arranged to be directed downwards. The width of the inclined wall portion 9a is gradually increased towards the helical portion B, and as is illustrated in FIG. 7, the entire portion of the side wall 9 is inclined at the connecting portion of the inlet passage portion A and the helical portion B. The upper half of the side wall 9 is smoothly connected to the circumferential wall of a cylindrical projection 11 (FIG. 2) which is formed on the upper wall of the intake port 6 at a position located around a valve guide 10 of the intake valve 5. The lower half of the side wall 9 is connected to the side wall 12 of the helical portion B at the helix terminating portion C of the helical portion B.

Figure 9:
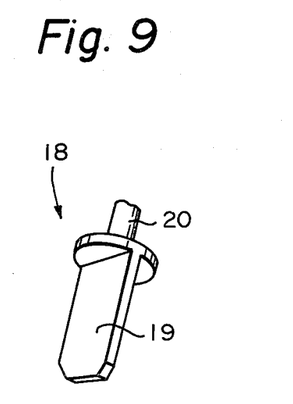
FIG. 9 is a perspective view of a rotary valve.

As illustrated in FIGS. 1 through 5, bypass passages 14, branched off the inlet passage portions A of the corresponding intake ports 6 and having a substantially uniform cross-section, are formed in the cylinder head 3, and each of the bypass passages 14 is connected to the helix terminating portion C of the corresponding intake port 6. Each of the inlet openings 15 of the bypass passages 14 is formed on the side wall 9 at a position located near the inlet open end of the inlet passage portion A of the corresponding intake port 6, and each of the outlet openings 16 of the bypass passages 14 is formed on the upper end portion of the side wall 12 at the helix terminating portion C of the corresponding intake port 6. In addition, valve insertion bores 17, extending across the corresponding bypass passages 14, are formed in the cylinder head 3, and rotary valves 18, each functioning as a flow control valve, are inserted into the corresponding valve insertion bores 17. The rotary valves 18 are inserted into the corresponding bypass passages 14, and as illustrated in FIG. 9, each of the rotary valves 18 comprises a thin plate-shaped valve body 19, and a valve shaft 20 formed in one piece on the valve body 19. The valve shaft 20 is rotatably supported by a guide sleeve 21 fitted into the valve insertion bore 17. The valve shaft 20 projects upwardly from the top face of the guide sleeve 21, and an arm 22 is fixed onto the projecting tip portion of the valve shaft 20.

Figure 10:
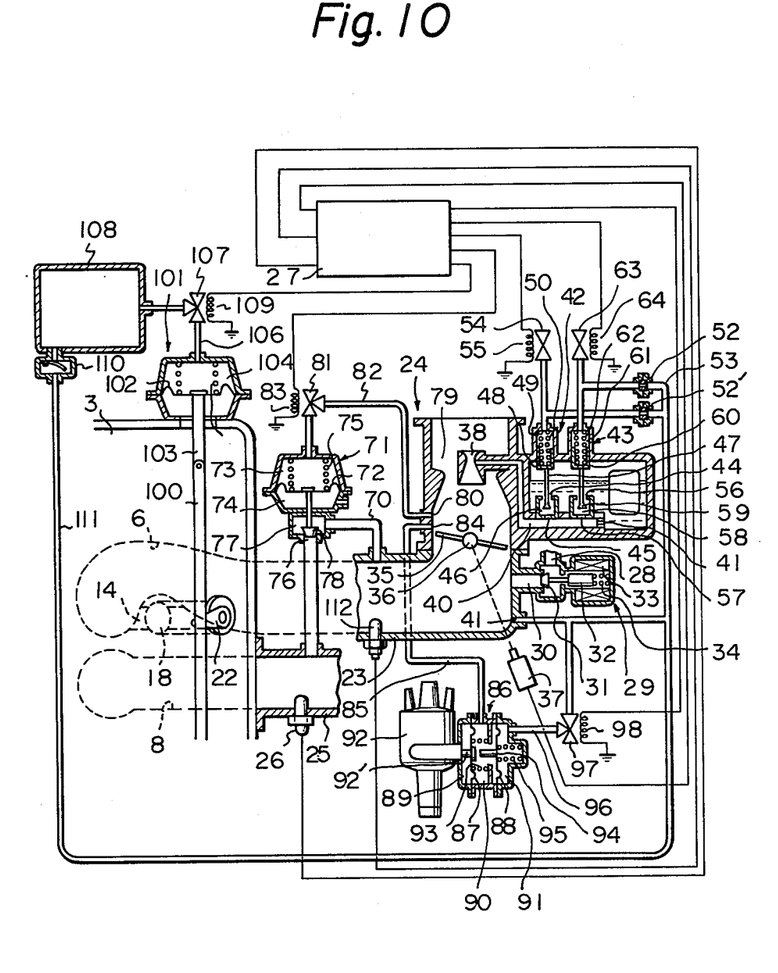
FIG. 10 is a view illustrating the entirety of an intake system.

Referring to FIG. 10, the intake ports 6 are connected to a carburetor 24 via an intake manifold 23, and the exhaust ports 8 are connected to the three way catalytic converter (not shown) via an exhaust manifold 25. An exhaust gas sensor, for example, an oxygen concentration detector 26 is arranged in the exhaust manifold 25 and connected to the input terminal of an electronic control unit 27. On the other hand, the intake manifold 23 is connected to an air cleaner (not shown) via a bypass pipe 28, and a linear solenoid valve 29, actuated in response to the output signal of the oxygen concentration detector 26, is arranged in the bypass pipe 28. The linear solenoid valve 29 comprises a valve body 31 controlling the flow area of a valve port 30, a movable plunger 32 connected to the valve body 31, a solenoid 33 for attracting the movable plunger 32, and a compression spring 34 for biasing the valve body 31 toward the valve port 30. The solenoid 33 is connected to the output terminal of the electronic control unit 27.

On the other hand, an idle switch 37 is connected to a throttle shaft 36 of a throttle valve 35 of the carburetor 24 and electrically connected to the input terminal of the electronic control unit 27. This idle switch 37 is turned when the throttle valve 35 is in the idling position. The carburetor 24 comprises a main nozzle 28, a float chamber 39, a main fuel passage 40 interconnecting the float chamber 39 to the main nozzle 28, and a main jet 41 inserted into the main fuel passage 40. In addition, a first power valve 42 and a second power valve 43 are arranged between the float chamber 39 and the main fuel passage 40. The first power valve 42 has a valve chamber 46 which is connected, on one hand, to the float chamber 39 via a valve port 44 and connected, on the other hand, to the main fuel passage 40 via a metering jet 45. In addition, the first power valve 42 comprises a valve body 47 controlling the opening operation of the valve port 44, a piston 48 fixed onto the upper end of the valve body 47, a vacuum chamber 49, and a compression spring 50 inserted into the vacuum chamber 49 for biasing the piston 48. The vacuum chamber 49 is connected, on one hand, to a vacuum port 51, which is open to the interior of the intake manifold 23, via a restricted opening 52' and a vacuum conduit 53, and the vacuum chamber 49 is connected, on the other hand, to the air outside via an electromagnetic control valve 54. A solenoid 55 of the electromagnetic control valve 54 is connected to the output terminal of the electronic control unit 27.

The second power valve 43 has a valve chamber 58 which is connected, on one hand, to the float chamber 39 via a valve port 56 and connected, on the other hand, to the main fuel passage 40 via a metering jet 57. In addition, the second power valve 43 comprises a valve body 59 controlling the opening operation of the valve port 56, a piston 60 fixed onto the upper end of the valve body 59, a vacuum chamber 61, and a compression spring 62 inserted into the vacuum chamber 61 for biasing the piston 60. The vacuum chamber 61 is connected, on one hand, to the vacuum port 51 via a restricted opening 52 and connected, on the other hand, to the air outside via an electromagnetic control valve 63. A solenoid 64 of the electromagnetic control valve 63 is connected to the output terminal of the electronic control unit 27.

On the other hand, an exhaust gas recirculation (EGR) control valve 71 is arranged in an EGR conduit 70 interconnecting the exhaust manifold 25 to the intake manifold 27. The EGR control valve 71 comprises a vacuum chamber 73 and an atmospheric pressure chamber 74 which are separated by a diaphragm 72. A compression spring 75 for biasing the diaphragm 72 is inserted into the vacuum chamber 73. In addition, the EGR control valve 71 comprises a valve chamber 77 having a valve port 76, and a valve body 78, connected to the diaphragm 72 and controlling the opening operation of the valve port 76, is arranged in the valve chamber 77. The vacuum chamber 73 is connected via an electromagnetic control valve 81 and a vacuum conduit 82 to a vacuum port 80 which is open to an air horn 79 of the carburetor 24. The vacuum port 80 is open to the air horn 79 located upstream of the throttle valve 35 when the throttle valve 35 is in the idling position. A solenoid 83 of the electromagnetic control valve 81 is connected to the output terminal of the electronic control unit 27.

On the other hand, another vacuum port 84, which is arranged beneath the vacuum port 80 and is open to the air horn 79 located upstream of the throttle valve 35 when the throttle valve 35 is in the idling position, is arranged in the carburetor 24 and connected to an ignition time control device 86 via a vacuum conduit 85. The ignition time control device 86 comprises an atmospheric pressure chamber 89, a first vacuum chamber 90 and a second vacuum chamber 91 which are separated by a pair of diaphragms 87, 88. The diaphragm 87 is connected to an ignition time advance shaft 92' of a distributor 92. A compression spring 93 for biasing the diaphragm 87 is inserted into the first vacuum chamber 90, and the first vacuum chamber 90 is connected to the vacuum port 84 via the vacuum conduit 85. In addition, a stop 94, which is engageable with the diaphragm 87, is fixed onto the diaphragm 88. A compression spring 95 for biasing the diaphragm 88 is inserted into the second vacuum chamber 91, and the second vacuum chamber 91 is connected to the vacuum port 51 via a conduit 96 and an electromagnetic control valve 97 which is able to open to the air outside. A solenoid 98 of the electromagnetic control valve 97 is connected to the output terminal of the electronic control unit 27.

On the other hand, the arms 22 of the rotary valves 18 are interconnected to each other via a connecting rod 100, and this connecting rod 100 is connected to a control rod 103 fixed onto a diaphragm 102 of an actuator 101. The actuator 101 comprises a vacuum chamber 104 which is separated from the air outside by the diaphragm 102, and a compression spring 105 for biasing the diaphragm 102 is inserted into the vacuum chamber 104. The vacuum chamber 105 is connected to a vacuum tank 108 via a vacuum conduit 106 and an electromagnetic control valve 107 which is able to open to the air outside, and a solenoid 109 of the electromagnetic control valve 107 is connected to the output terminal of the electronic control unit 27. The vacuum tank 108 is connected to the vacuum port 51 via a vacuum conduit 111 and a check valve 110 which permits only the outflow of air from the vacuum tank 108. The check valve 110 opens when the level of vacuum in the intake manifold 23 becomes greater than that of vacuum in the vacuum tank 108, and the check valve 110 closes when the level of vacuum in the intake manifold 23 becomes smaller than that of the vacuum in the vacuum tank 108. Consequently, the level of vacuum in the vacuum tank 108 is maintained at the maximum vacuum level which has been produced in the intake manifold 23. A vacuum sensor 112 for detecting the level of vacuum produced in the intake manifold 23 is arranged in the intake manifold 23 and connected to the input terminal of the electronic control unit 27. The vacuum sensor 112 produces an output voltage which is proportional to the level of vacuum in the intake manifold 23 and, thus, the output voltage of the vacuum sensor 112 is increased as the level of vacuum in the intake manifold 23 becomes great.

Figure 11A:
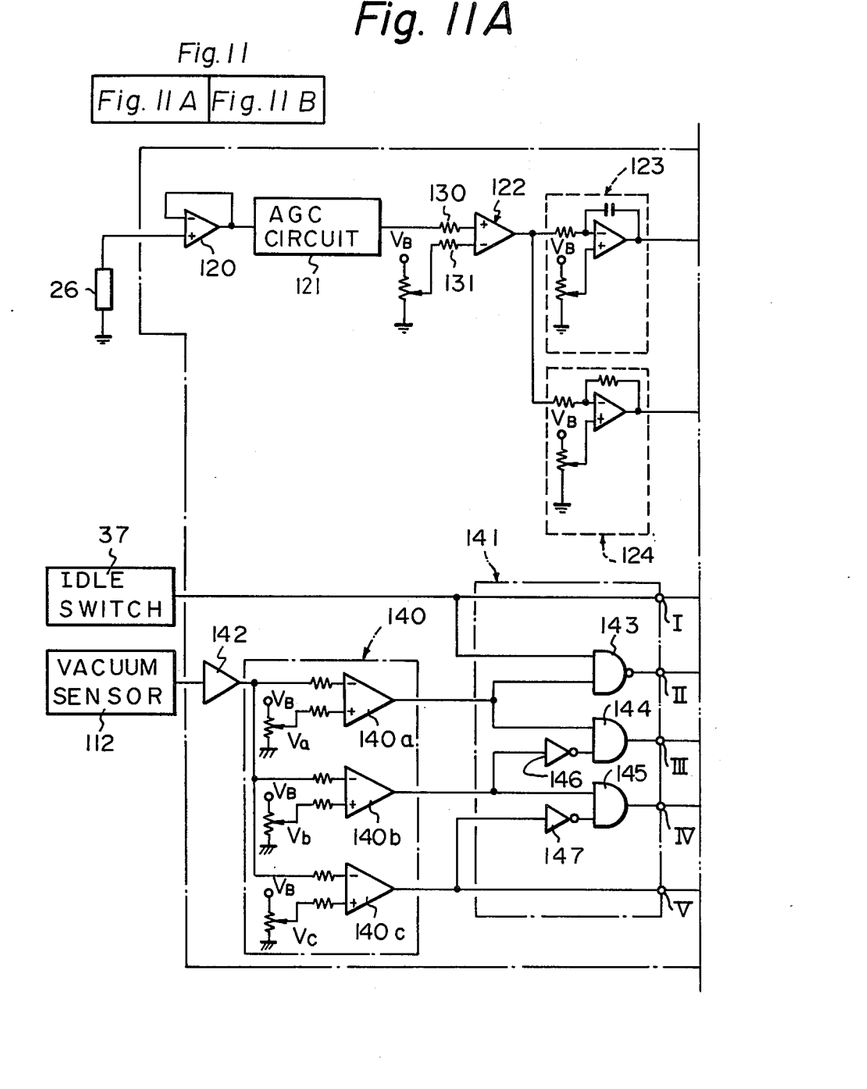
FIGS. 11A and 11B are circuit diagrams of an electronic control unit.
Figure 11B:
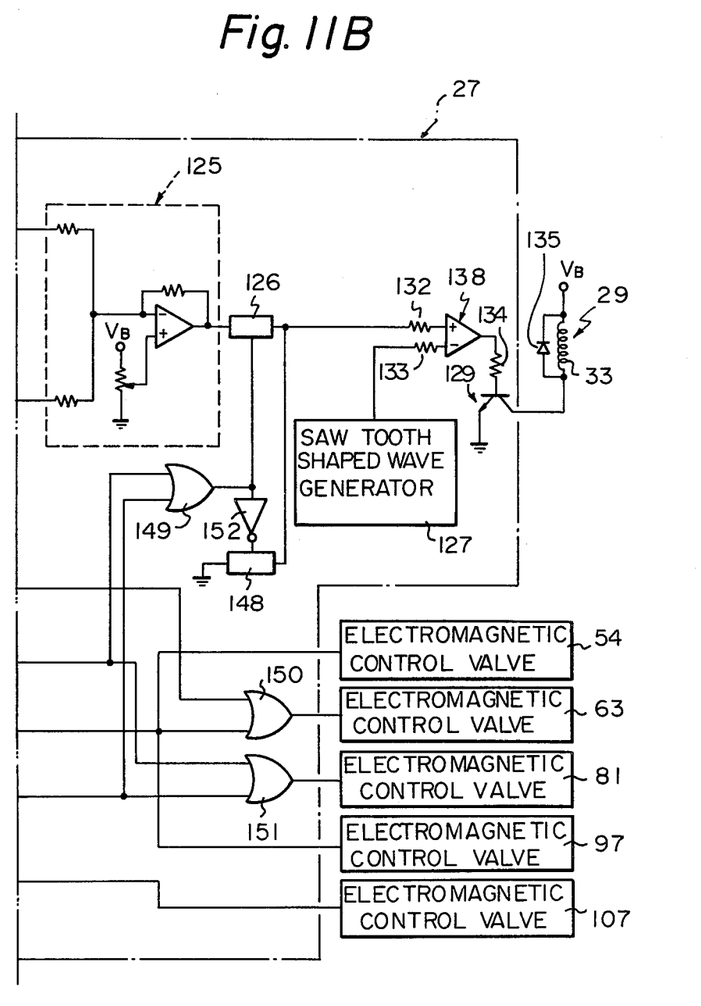

FIG. 11 illustrates a circuit diagram of the electronic control unit 27. In FIG. 11, $V_B$ indicates a power supply voltage. Referring to FIG. 11, the oxygen concentration detector 26 illustrated in FIG. 1, is illustrated by a block 26. The oxygen concentration detector 8 produces an output voltage of about 0.1 volt when an air-fuel ratio of the mixture fed into the cylinder of an engine is larger than the stoichiometric air-fuel ratio. On the other hand, the oxygen concentration detector 8 produces an output voltage of 0.9 volt when an air-fuel ratio of the mixture fed into the cylinder of an engine is less than the stoichiometric air-fuel ratio.

As illustrated in FIG. 11, the electronic control unit 27 comprises a voltage follower 120, an AGC circuit 121, a first comparator 122, an integrating circuit 123, a proportional circuit 124, an adder circuit 125, a first analog switch 126, a saw tooth shaped wave generating circuit 127, a second comparator 128 and a transistor 129. The output terminal of the oxygen concentration detector 26 is connected to the non-inverting input terminal of the voltage follower 120 and the output terminal of the voltage follower 120 is connected to the input terminal of the AGC circuit 121. The output terminal of the AGC circuit 121 is connected to the noninverting input terminal of the first comparator 122 via a resistor 130 and a reference voltage of about 0.4 volt is applied to the inverting input terminal of the first comparator 122 via a resistor 131. The output terminal of the first comparator 122 is connected, on one hand, to the input terminal of the integrating circuit 123 and, on the other hand, to the input terminal of the proportional circuit 124. The output terminal of the integrating circuit 123 is connected to a first input terminal of the adder circuit 125 and the output terminal of the proportional circuit 124 is connected to a second input terminal of the adder circuit 125. The output terminal of the adder circuit 125 is connected to the noninverting input terminal of the second comparator 128 via the first analog switch 126 and a resistor 132, and the inverting input terminal of the second comparator 128 is connected to the saw tooth shaped wave generating circuit 127 via a resistor 133. The output terminal of the second comparator 128 is connected to the base of the transistor 129 via a resistor 134. The emitter of the transistor 129 is grounded and the collector of the transistor 129 is connected to the solenoid 33 of a linear solenoid valve 29. In addition, a diode 135 for absorbing surge current is connected, in parallel, to the solenoid 33.

Figure 12:
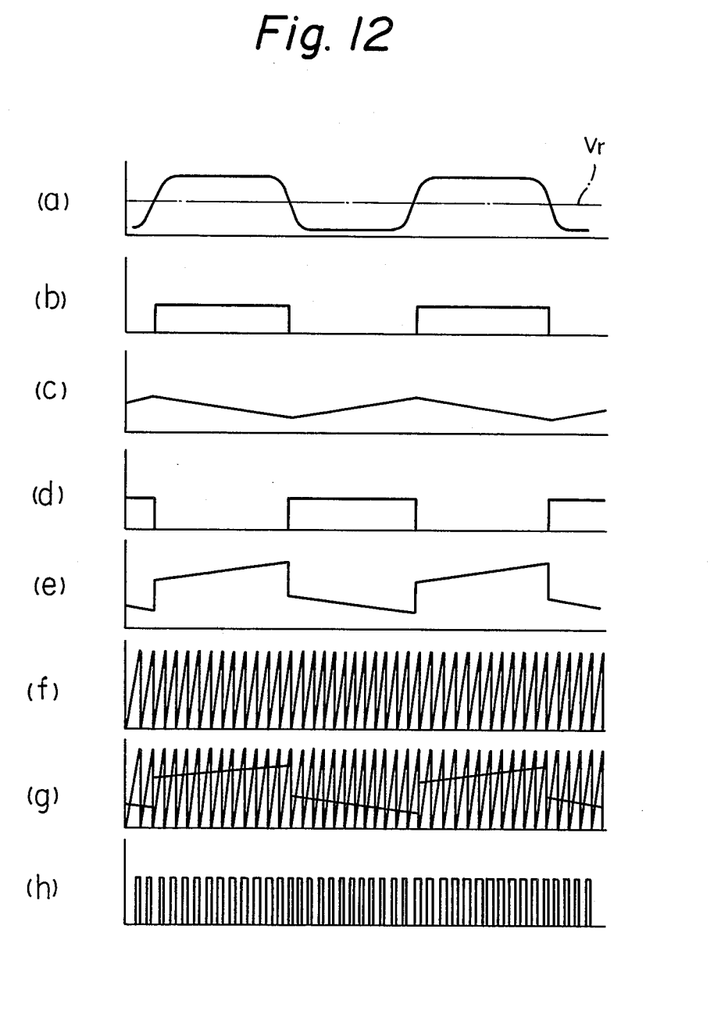
FIG. 12 is a diagram for illustrating the operation of the electronic control unit.

The output signal of the oxygen concentration detector 26 is fed into the AGC circuit 121 via the voltage follower 120. The AGC circuit 121 is an amplifier which is constructed so that the gain of the amplifier becomes large when the mean value of the output voltage of the oxygen concentration detector 26 becomes low. Consequently, the AGC circuit 121 produces an output voltage changed in proportion to the output voltage of the oxygen concentration detector 26 and having a mean value which is maintained constant. FIG. 12(a) illustrates the output voltage of the AGC circuit 121. In addition, in FIG. 12(a), $V_r$ indicates the reference voltage applied to the inverting input terminal of the first comparator 122. The first comparator 122 produces the high level output when the output voltage of the AGC circuit 121 becomes larger than the reference voltage $V_r$. Thus, the first comparator 122 produces an output voltage as illustrated in FIG. 12(b). The output voltage of the first comparator 122 is integrated in the integrating circuit 123 and, as a result, the integrating circuit 123 produces an output voltage as illustrated in FIG. 12(c). On the other hand, the output voltage of the first comparator 122 is inverted and amplified in the proportional circuit 124 and, thus, the proportional circuit 124 produces an output voltage as illustrated in FIG. 12(d). The output voltage of the integrating circuit 123 and the output voltage of the proportional circuit 124 are added in the adder circuit 125 and, thus, the adder circuit 125 produces an output voltage as illustrated in FIG. 12(e). On the other hand, the saw tooth shaped wave generating circuit 127 produces a saw tooth shaped output voltage of a fixed frequency as illustrated in FIG. 12(f). If the first analog switch 126 is in the conductive state, the output voltage of the adder circuit 125 and the output voltage of the saw tooth shaped wave generating circuit 127 are compared in the second comparator 128 as illustrated in FIG. 12(g). The second comparator 128 produces the high level output when the output voltage of the adder circuit 125 becomes larger than that of the saw tooth shaped wave generating circuit 127. Consequently, the second comparator 128 produces continuous pulses, as illustrated in FIG. 12(h), and the widths of the continuous pulses are proportional to the level of the output voltage of the adder circuit 125. An electric current fed into the solenoid 33 is controlled by the continuous pulses, so that the amount of electric current fed into the solenoid 33 is increased as the widths of the continuous pulses are increased. From FIG. 12, it will be understood that, when the AGC circuit 121 produces the high level output, that is, when the air-fuel ratio of mixture fed into the cylinder of an engine becomes smaller than the stoichiometric air-fuel ratio, the widths of the continuous pulses produced at the output terminal of the second comparator 128 are increased, and thereby, the amount of electric current fed into the solenoid 33 is increased. If the amount of electric current fed into the solenoid 33 is increased, the opening area of the valve port 30 is increased. As a result of this, since the amount of air fed into the intake manifold 23 via the bypass pipe 28 is increased, the air-fuel ratio of fuel mixture fed into the cylinders of the engine becomes large. On the other hand, if the air-fuel ratio of fuel mixture fed into the cylinders of the engine becomes larger than the stoichiometric air-fuel ratio, the output voltage of the AGC circuit 121 becomes low. As a result of this, since electric current fed into the solenoid 33 is reduced, the amount of air fed into the intake manifold 23 via the bypass pipe 28 is reduced and, thus, the air-fuel ratio of fuel mixture fed into the cylinders of the engine becomes small. Thus, the air-fuel ratio of fuel mixture fed into the cylinders of the engine becomes equal to the stoichiometric air-fuel ratio.

Referring to FIG. 11, the electronic control unit 27 comprises a vacuum level detecting circuit 140 and a control signal generating circuit 141, and the output terminal of the vacuum sensor 112 is connected to the input terminal of the vacuum level detecting circuit 140 via an amplifier 142. The vacuum level detecting circuit 140 comprises three comparators 140a, 140b, and 140c, and the inverting input terminals of the comparators 140a, 140b and 140c are connected to the output terminal of the amplifier 142. In addition, reference voltages $V_a$, $V_b$, and $V_c$ are applied to the noninverting input terminals of the comparators 140a, 140b, and 140c, respectively, and the reference voltages $V_a$, $V_b$, and $V_c$ have the relationship of $V_a > V_b > V_c$. Consequently, the output voltage of the comparators 140a, 140b, and 140c successively becomes high in this order as the level of vacuum in the intake manifold 25 becomes small. For example, the reference voltages $V_a$, $V_b$, and $V_c$ are determined so that the output voltage of the comparator 140a becomes high when the level of vacuum in the intake manifold 25, that is, the manifold vacuum level becomes smaller than $-500$ mmHg; the output voltage of the comparator 140b becomes high when the manifold vacuum level becomes smaller than $-250$ mmHg; and the output voltage of the comparator 140c becomes high when the manifold vacuum level becomes smaller than $-100$ mmHg.

The control signal generating circuit 141 comprises a NAND gate 143, a pair of AND gates 144, 145, and five output terminals I, II, III, IV, V. One of the input terminals of the NAND gate 143 is connected to the idle switch 37, and the other input terminal of the NAND gate 143 is connected to the output terminal of the comparator 140a. One of the input terminals of the AND gate 144 is connected to the output terminal of the comparator 140a, and the other input terminal of the AND gate 144 is connected to the output terminal of the comparator 140b via an invertor 146. One of the input terminals of the AND gate 145 is connected to the output terminal of the comparator 140b, and the other input terminal of the AND gate 145 is connected to the output terminal of the comparator 140c via an inverter 147. In addition, the electric control unit 27 comprises a second analog switch 148 and three OR gates 149, 150, and 151. The connecting point of the first analog switch 148 and the resistor 132 is grounded via the second analog switch 148. The first analog switch 126 is directly controlled by the output signal of the OR gate 149, and the second analog switch 148 is controlled by the output signal of the OR gate 149 via an invertor 152. One of the input terminals of the OR gate 149 is connected to the output terminal II, and the other input terminal of the OR gate 149 is connected to the output terminal IV. On the other hand, the electromagnetic control valve 54 is connected to the output terminal III, and the electromagnetic control valve 63 is connected to the output terminal of the OR gate 150. One of the input terminals of the OR gate 150 is connected to the output terminal I, and the other input terminal of the OR gate 150 is connected to the output terminal III. In addition, the electromagnetic control valve 97 is connected to the output terminal III, and the electromagnetic control valve 81 is connected to the output terminal of the OR gate 151. One of the input terminals of the OR gate 151 is connected to the output terminal II, and the other input terminal of the OR gate 151 is connected to the output terminal IV. The electromagnetic control valve 107 is connected to the output terminal V.

Figure 13:
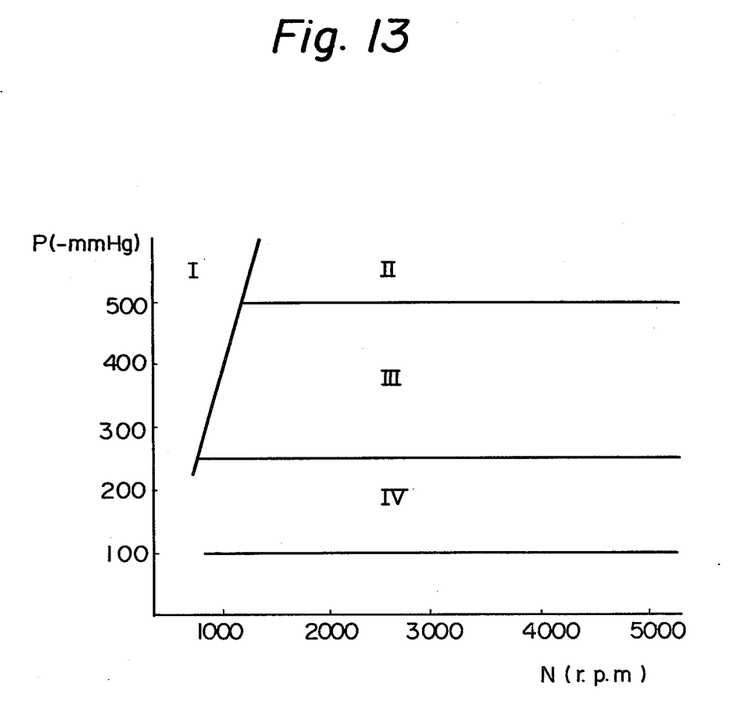
FIG. 13 is a diagram illustrating the same air-fuel ratio regions.

FIG. 13 illustrates the same air-fuel ratio regions I, II, III, IV, and V. In FIG. 13, the ordinate P indicates vacuum ($-$mmHg) produced in the intake manifold 23, and the abscissa N indicates the number of revolutions per minute (r.p.m.) of the engine. In addition, in FIG. 13, the region I indicates a region where the engine is operating in the idling state; the region II indicates a region where the engine is operating under an extremely light load; the region III indicates a region where the engine is operating under a light load; the region IV indicates a region where the engine is operating under a middle load; and the region V indicates a region where the engine is operating under a heavy load. When the engine is operating in the idling state, the idle switch 37 is in the on position, and the output voltage of all the comparators 140a, 140b, and 140c is low. Consequently, a high voltage is produced at only the output terminal I of the control signal generating circuit 141, and the output voltage, produced at the remaining output terminals II, III, IV, and V, remains low. On the other hand, when the manifold vacuum level P is greater than $-500$ mmHg, and the engine operating state is not the idling state, the idle switch 37 is turned off, and the output voltage of all the comparators 140a, 140b, and 140c is low. Consequently, at this time, a high voltage is produced at only the output terminal II of the control signal generating circuit 141, and the output voltage, produced at the remaining output terminals I, III, IV, and V, becomes low. When the manifold vacuum level P is in the range of $-250$ through $-500$ mmHg, the idle switch 37 is in the off position, and the output voltage of only the comparator 140a becomes high. Consequently, at this time, only the output voltage, produced at the output terminal III of the control signal generating circuit 141, becomes high. When the manifold vacuum level P is in the range of $-100$ through $-250$ mmHg, the idle switch 37 is in the off position, and the output voltage of the comparators 140a and 140b becomes high. Consequently, at this time, only the output voltage, produced at the output terminal IV of the control signal generating circuit 141, becomes high. When the manifold vacuum level P is smaller than $-100$ mmHg, the idle switch 37 is in the off position, and the output voltage of all the comparators 140a, 140b and 140c becomes high. Consequently, at this time, only the output voltage, produced at the output terminal V of the control signal generating circuit 141, becomes high. Therefore, it will be understood that the output voltage, produced at the output terminals I, II, III, IV, and V of the control signal generating circuit 141, becomes high when the engine is operating in a state illustrated by the corresponding regions I, II, III, IV, and V in FIG. 13, respectively.

When the engine is operating in the state illustrated in the region I in FIG. 13, that is, in the idling state, as mentioned above, only the output voltage, produced at the output terminal I of the control signal generating circuit 141, becomes high, and the output voltage, produced at the remaining output terminals II, III, IV, and V becomes low. Consequently, at this time, since the output voltage of the OR gate 149 becomes low, the first analog switch 126 is turned to the nonconductive state, and the second analog switch 148 is turned to the conductive state. As a result of this, since electric current is not fed into the solenoid 33 of the linear solenoid valve 29, the valve body 31 (FIG. 10) closes the valve port 30 due to the spring force of the compression spring 34, and, thus, the feeding of air into the intake manifold 23 from the bypass pipe 28 is stopped. On the other hand, since the solenoid 55 of the electromagnetic control valve 54 is de-energized, the electromagnetic control valve 54 opens. Consequently, since ambient air is fed into the vacuum chamber 49 of the first power valve 42 and, thus, the piston 48 moves downward due to the spring force of the compression spring 50, the valve body 47 opens the valve port 44. On the other hand, since the solenoid 64 of the electromagnetic control valve 63 is energized, the electromagnetic control valve 63 opens. Consequently, since vacuum in the intake manifold 23 acts on the vacuum chamber 61 of the second power valve 43, the piston 60 moves upward against the compression spring 62 and, thus, the valve body 59 closes the valve port 56. On the other hand, since the solenoid 83 of the electromagnetic control valve 81 is de-energized, the vacuum chamber 73 of the EGR control valve 81 becomes open to the air outside. As a result of this, since the diaphragm 72 moves downward against the compression spring 75, the valve body 78 closes the valve port 76 and, thus, the feeding of the recirculated exhaust gas into the intake manifold 23 is stopped. On the other hand, since the solenoid 98 of the electromagnetic control valve 97 is de-energized, the second vacuum chamber 91 of the ignition time control device 86 becomes open to the outside air. Consequently, since the diaphragm 88 moves towards the left in FIG. 10 due to the spring force of the compression spring 95, the stop 94 also moves towards the left in FIG. 10 and, as a result, the movement of the diaphragm 87 is restricted by the stop 94. Consequently, at this time, the advance of the ignition time becomes small. On the other hand, since the solenoid 109 of the electromagnetic control valve 107 is de-energized, the vacuum chamber 104 of the actuator 101 becomes open to the outside air. Consequently, at this time, the diaphragm 102 moves away from the vacuum chamber 104 due to the spring force of the compression spring 105 and, as a result, the rotary valve 18 closes the bypass passage 14. As mentioned above, when the engine is operating in the idling state, only the first power valve 42 opens, and the second power valve 43 and the linear solenoid valve 29 close. As a result of this, at this time, a relatively lean mixture, having an air-fuel ratio of 15 through 18:1, is fed into the cylinders of the engine.

When the engine is operating in the state illustrated by the region II in FIG. 13, that is, under an extremely light load, since the output voltage, produced at the output terminal II of the control signal generating circuit 141, becomes high, and the output voltage, produced at the output terminal I, becomes low, the solenoid 64 of the electromagnetic control valve 63 is de-energized. As a result of this, the vacuum chamber 61 of the second power valve 43 becomes open to the atmosphere and, thus, both the first power valve 42 and the second power valve 43 open. On the other hand, at this time, since the output voltage of the OR gate 149 becomes high, the first analog switch 126 is turned to the conductive state. As a result of this, since the feedback control of the air-fuel ratio is started, the air-fuel ratio of fuel mixture fed into the cylinders of the engine becomes equal to the stoichiometric air-fuel ratio. In addition, at this time, since the solenoid 83 of the electromagnetic control valve 81 is energized, the vacuum chamber 73 of the EGR control valve 71 is connected to the vacuum port 80 and, thus, the recirculated exhaust gas is fed into the intake manifold 23. The operation of the electronic control unit 27, which is carried out when the engine is operating in the state illustrated by the region II in FIG. 13, is the same as the operation of the electronic control unit 27, which is carried out when the engine is operating in the state illustrated by the region IV in FIG. 13. Consequently, the operation of the electronic control unit 27 regarding the region IV is omitted.

When the engine is operating in a state illustrated by the region III in FIG. 13, that is, under a middle load, the output voltage, produced at the output terminal III of the control signal generating circuit 141, becomes high. As a result of this, since the solenoids 55, 64 of the electromagnetic control valves 54, 63 are energized, both the first power valve 42 and the second power valve 43 close. In addition, at this time, since the first analog switch 126 is turned again to the nonconductive state, the feedback control of air-fuel ratio is stopped and, since the solenoid 83 of the electromagnetic control valve 81 is de-energized, the feeding of the recirculated exhaust gas into the intake manifold 23 is stopped. Furthermore, since the solenoid 98 of the electromagnetic control valve 97 is energized, the second vacuum chamber 91 of the ignition time control device 86 is connected to the intake manifold 23 and, as a result, the diaphragm 88 moves towards the right in FIG. 10 against the compression spring 95. Consequently, at this time, since the movement of the diaphragm 87 is not restricted by the stop 94, the ignition time is advanced. As mentioned above, when the engine is operating in the state illustrated by the region III in FIG. 13, since both the first power valve 42 and the second power valve 43 close, a super lean mixture, having an air-fuel ratio of about 17 through 22:1, is fed into the cylinders of the engine.

When the engine is operating in the state illustrated by the region V in FIG. 13, that is, under a heavy load, the solenoids 55, 64 of the electromagnetic control valves 54, 63 are de-energized. As a result of this, since both the first power valve 42 and the second power valve 43 opens, a rich mixture, having an air-fuel ratio of about 11 through 14:1, is fed into the cylinders of the engine. In addition, since the solenoids 83, 98 of the electromagnetic valves 81, 97 are de-energized, the feeding of the recirculated exhaust gas into the intake manifold 23 is stopped, and the movement of the diaphragm 87 of the ignition time control device 86 is restricted by the stop 94. Furthermore, at this time, since the solenoid 109 of the electromagnetic control valve 107 is energized, the vacuum chamber 104 of the actuator 101 is connected to the vacuum tank 108 and, thus, the diaphragm 102 moves towards the vacuum chamber 104 against the compression spring 105. As a result of this, the rotary valve 18 is rotated and opens the bypass passage 14.

Summarizing the operation of the control system, it is indicated as the following table.

| Region | Air-fuel Ratio | First Power Valve | Second Power Valve | Linear Solenoid Valve | Recirculated Exhaust Gas | Ignition Time |
|---|---|---|---|---|---|---|
| I | 15~18:1 | open | close | close | feed | ad- |

-continued

| Region | Air-fuel Ratio | First Power Valve | Second Power Valve | Linear Solenoid Valve | Recirculated Exhaust Gas | Ignition Time |
|---|---|---|---|---|---|---|
| II | stoichiometric | open | open | open | | vance |
| III | 17~22:1 | close | close | close | feed | |
| IV | stoichiometric | open | open | open | | |
| V | 11~14:1 | open | open | close | | |

In the above table, the feeding of the recirculated exhaust gas may be stopped in the region II.

As is understood from the above table, when the engine is operating under a relatively light load as in the region I, II, III and IV, the rotary valve 18 closes the bypass passage 14. At this time, the mixture introduced into the inlet passage portion A moves downward, while swirling, along the upper wall 13 of the helical portion B. Then, since the mixture, while swirling, flows into the combustion chamber 4, a strong swirl motion is created in the combustion chamber 4. Consequently, even if a super lean mixture is fed into the cylinders of the engine as in the region III, it is possible to obtain a stable combustion.

On the other hand, when the engine is operating under a heavy load where a high output power of the engine is required, since the rotary valve 18 opens the bypass passage 14 as illustrated in the region V of the above table, a part of the mixture introduced into the inlet passage portion A is fed into the helical portion B via the bypass passage 14 having a low flow resistance. Then, this part of the mixture collides head-on with the mixture stream flowing along the upper wall 13 of the helical portion B. As a result of this, since the mixture stream flowing along the upper wall 13 of the helical portion B is decelerated, a swirl motion is weakened. As mentioned above, when the engine is operating under a heavy load, since the rotary valve 18 opens, the entire flow area of the intake port 6 is increased, and a swirl motion is weakened, it is possible to obtain a high volumetric efficiency. In addition, by forming the inclined wall portion 9a, the flow direction of a part of the mixture introduced into the inlet passage portion A is deflected downward. As a result of this, since the part of the mixture flows into the helical portion B along the bottom wall of the intake port 6 without swirling, the flow resistance of the intake port 6 becomes small, making it possible to further increase a volumetric efficiency when the engine is operating under a heavy load.

In the embodiment illustrated in FIG. 10, the air-fuel ratio is controlled in such a way that the amount of fuel fed into the intake manifold 23 is controlled by the first power valve 42 and the second power valve 43. However, the air-fuel ratio may be controlled in such a way that the amount of auxiliary air fed into the intake passage 23, or the amount of air bled into the main fuel passage 40 is controlled. In addition, instead of using a vacuum advance type ignition time control device, an ignitor may be used.

According to the present invention, since it is possible to create a strong swirl motion in the combustion chamber by using the helically-shaped intake port, even if a super lean mixture, having an air-fuel ratio of about 22:1, is used, it is possible to obtain a stable combustion and, thus, it is possible to improve the specific fuel consumption. In addition, when the engine is operating under a light load, since the air-fuel ratio is reduced, it is possible to suppress the occurrence of the torque fluctuation. Furthermore, since a lean mixture can be used at the time of idling, it is possible to improve the specific fuel consumption. In addition, when the engine is operating under a heavy load, since a rich mixture is fed into the cylinders of the engine, it is possible to obtain a high output power of the engine and, since a volumetric efficiency is increased by opening the rotary valve, it is possible to further increase the output power of the engine.

While the invention has been described with reference to a specific embodiment chosen for the purpose of illustration, it should be apparent that numerous modifications can be made thereto by those skilled in the art without departing from the spirit and scope of the invention.

We claim:

1. An internal combustion engine comprising:
a helically-shaped intake port;
an intake passage connected to said intake port;
an exhaust passage;
a vacuum sensor arranged in said intake passage for detecting the level of vacuum in said intake passage;
an oxygen concentration detector arranged in said exhaust passage for detecting whether the air-fuel ratio of mixture fed into the engine from said intake port is larger or smaller than the stoichiometric air-fuel ratio;
an air-fuel ratio control device arranged in said intake passage for controlling the amount of fuel and air fed into said intake passage; and
an electronic control unit controlling said air-fuel ratio control device in response to output signals of said vacuum sensor and said oxygen concentration detector for feeding a first lean mixture into the engine when said level of vacuum is in the range of about −500 through −250 mmHg; for feeding a fuel mixture having the stoichiometric air-fuel ratio into the engine when said level of vacuum is in the range of about −250 through −100 mmHg; and for feeding a rich mixture into the engine when said level of vacuum is smaller than about −100 mmHg.

2. An internal combustion engine according to claim 1, wherein the engine comprises an idle sensor for detecting that the engine is operating in the idling state, said electronic control unit controlling said air-fuel ratio control device in response to an output signal of said idle sensor for feeding a second lean mixture, which is richer than said first lean mixture, into the engine when the engine is operating in the idling state.

3. An internal combustion engine according to claim 1, wherein the engine comprises an idle sensor for detecting that the engine is operating in the idling state, said electronic control unit controlling said air-fuel ratio control device in response to an output signal of said idle sensor for feeding a mixture having the stoichiometric air-fuel ratio into the engine when said level of vacuum is greater than about −500 mmHg and when the engine operating state is not the idling state.

4. An internal combustion engine according to claim 1, wherein said air-fuel ratio control device comprises a carburetor feeding a main fuel into said intake passage, an air supply control apparatus having an air valve for controlling the amount of additional air fed into said intake passage, and a fuel supply control apparatus having a fuel valve for controlling the amount of additional fuel fed into said intake passage.

5. An internal combustion engine according to claim 4, wherein said air valve and said fuel valve are closed when said level of vacuum is in the range of about −500 through −250 mmHg for feeding said first lean mixture into the engine.

6. An internal combustion engine according to claim 4, wherein said air valve and said fuel valve are opened when said level of vacuum is in the range of about −250 through −100 mmHg for feeding the fuel mixture, having the stoichiometric air-fuel ratio, into said intake passage.

7. An internal combustion engine according to claim 6, wherein said air valve is a linear solenoid valve having a flow area which is changed in response to the output signal of said oxygen concentration detector.

8. An internal combustion engine according to claim 4, wherein said air valve is closed and said fuel valve is opened when said level of vacuum is smaller than about −100 mmHg for feeding said rich mixture into said intake passage.

9. An internal combustion engine according to claim 4, wherein the engine comprises an idle sensor for detecting that the engine is operating in the idling state, said fuel valve comprising a first valve for feeding a first additional fuel into said intake passage, and a second valve actuated in response to an output signal of said idle sensor for feeding a second additional fuel into said intake passage.

10. An internal combustion engine according to claim 9, wherein said first valve is opened and said second valve and said air valve are closed when the engine is operating in the idling state for feeding a second lean mixture, which is richer than said first lean mixture, into said intake passage.

11. An internal combustion engine according to claim 9, wherein said first valve and said second valve are opened and said air valve is closed when said level of vacuum is greater than about −500 mmHg and when the engine operating state is the idling state for feeding the fuel mixture having the stoichiometric air-fuel ratio into said intake passage.

12. An internal combustion engine according to claim 11, wherein said air valve is a linear solenoid valve having a flow area which is changed in response to the output signal of said oxygen concentration detector.

13. An internal combustion engine according to claim 9, wherein said carburetor comprises a float chamber and a main fuel passage interconnecting said float chamber to said intake passage, said first valve and said second valve being arranged between said float chamber and said main fuel passage.

14. An internal combustion engine according to claim 9, wherein said fuel supply control device comprises a first piston connected to said first valve and defining a first vacuum chamber, and a second piston connected to said second valve and defining a second vacuum chamber, said first vacuum chamber and said second vacuum chamber being connected, on one hand, to said intake passage via corresponding restricted openings and, on the other hand, to the atmosphere via corresponding electromagnetic control valves which are controlled by said electronic control unit.

15. An internal combustion engine according to claim 1, wherein the engine comprises an EGR passage interconnecting said exhaust passage to said intake passage, and an EGR control valve arranged in said EGR passage and controlled by said electronic control unit for feeding a recirculated exhaust gas into said intake passage when said level of vacuum is in the range of about −250 through −100 mmHg.

16. An internal combustion engine according to claim 15, wherein said intake passage comprises a throttle valve arranged therein, and a vacuum port which is open to said intake passage located upstream of said throttle valve when the degree of opening of said throttle valve is smaller than a predetermined degree, but is open to said intake passage located downstream of said throttle valve when the degree of opening of said throttle valve is larger than said predetermined degree, said EGR valve comprising a vacuum operated diaphragm apparatus which has a vacuum chamber, and an electromagnetic control valve controlled by said electronic control unit and selectively connecting said vacuum chamber to said vacuum port or to the air outside.

17. An internal combustion engine according to claim 1, wherein the engine comprises an ignition time control device controlled by said electronic control unit for advancing an ignition time when said level of vacuum is in the range of about −500 through −250 mmHg.

18. An internal combustion engine according to claim 17, wherein said intake passage comprises a throttle valve arranged therein, and a vacuum port which is open to said intake passage located upstream of said throttle valve when the degree of opening of said throttle valve is smaller than a predetermined degree, but is open to said intake passage located downstream of said throttle valve when the degree of opening of said throttle valve is larger than said predetermined degree, said ignition time control device comprising a distributor which has an ignition time advance shaft, a first diaphragm connected to said ignition time advance shaft, and a second diaphragm which defines a first vacuum chamber between said first diaphragm and said second diaphragm and defines a second vacuum chamber located opposite said first vacuum chamber with respect to said second diaphragm, said second diaphragm having a stop which projects into said first vacuum chamber and is engageable with said first diaphragm, said first vacuum chamber being connected to said vacuum port, said second vacuum chamber being selectively connected to said intake passage or the atmosphere via an electromagnetic control valve controlled by said electronic control unit.

19. An internal combustion engine according to claim 1, wherein said intake port comprises a helical portion formed around an intake valve, a substantially straight inlet passage portion tangentially connected to said helical portion and having a helix terminating portion, a bypass passage branched off from said inlet passage portion and connected to the helix terminating portion of said helical portion, and normally closed valve means arranged in said bypass passage for controlling the flow area of said bypass passage, the engine comprising an actuator which is controlled by said electronic control unit and controls said valve means for opening said valve means when said level of vacuum is smaller than about −100 mmHg.

20. An internal combustion engine according to claim 19, wherein said actuator comprises a vacuum operated diaphragm apparatus having a vacuum chamber and connected to said valve means, and an electromagnetic control valve controlled by said electronic control unit and selectively connecting said vacuum chamber to outside air or a vacuum source.

21. An internal combustion engine according to claim 20, wherein said vacuum source is a vacuum tank connected to said intake passage via a check valve which permits only the outflow of air from said vacuum tank.

22. An internal combustion engine according to claim 19, wherein said intake passage portion has an inlet open end located furthest from said helical portion, said bypass passage having an inlet opening which is open to said inlet passage portion at a position near said inlet open end.

23. An internal combustion engine according to claim 22, wherein said intake passage portion comprises an upper wall, a bottom wall, a first side wall located near said intake valve, and a second side wall located remote from said intake valve, said first side wall comprising a downwardly inclined portion located near said helical portion, and a substantially vertical portion located near said inlet open end, the inlet opening of said bypass passage being formed on said vertical portion.

24. An internal combustion engine according to claim 23, wherein said intake port comprises a valve guide projecting into said helical portion from an upper wall of said helical portion and having a circumferential wall, said downwardly inclined portion being tangentially connected to the circumferential wall of said valve guide.

25. An internal combustion engine according to claim 19, wherein said bypass passage has an outlet opening which is open to said helical portion at a position near a top wall of said helical portion.

26. An internal combustion engine according to claim 19, wherein said valve means comprises a rotary valve rotatably arranged in said bypass passage.

27. An internal combustion engine according to claim 26, wherein said rotary valve comprises a thin plate-shaped valve body extending through said bypass passage.

* * * * *